United States Patent
Aoki et al.

[19]

[11] Patent Number: 5,831,585
[45] Date of Patent: *Nov. 3, 1998

[54] LIGHT TRANSMISSION SCREEN

[75] Inventors: Satoshi Aoki, Kadoma; Hirokazu Sakaguchi, Toyonaka; Katsuaki Mitani, Ibaraki, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 597,099

[22] Filed: Feb. 7, 1996

[30] Foreign Application Priority Data

Feb. 8, 1995 [JP] Japan ................................. 7-020390

[51] Int. Cl.⁶ ............................................. B03B 21/56
[52] U.S. Cl. ........................... 345/32; 359/455; 359/457; 359/742
[58] Field of Search ........................ 345/1, 32; 359/453, 359/454, 455, 456, 457, 460, 742

[56] References Cited

U.S. PATENT DOCUMENTS

| | | | |
|---|---|---|---|
| 4,874,228 | 10/1989 | Aho et al. | 350/345 |
| 5,074,644 | 12/1991 | Hirai et al. | 359/455 |
| 5,206,761 | 4/1993 | Ogino | 359/457 |
| 5,241,416 | 8/1993 | Mitsutake et al. | 359/456 |
| 5,345,249 | 9/1994 | Biemans | 345/1 |
| 5,390,050 | 2/1995 | Yanagi et al. | 359/742 |
| 5,400,114 | 3/1995 | Yoshida et al. | 359/457 |
| 5,426,531 | 6/1995 | Tsukagoshi | 359/457 |
| 5,457,572 | 10/1995 | Ishii et al. | 359/457 |
| 5,581,407 | 12/1996 | Mitani et al. | 359/619 |

FOREIGN PATENT DOCUMENTS 4-283736  10/1992  Japan .

*Primary Examiner*—Steven J. Saras
*Assistant Examiner*—Vincent E. Kovalick
*Attorney, Agent, or Firm*—Ratner & Prestia

[57] ABSTRACT

A light transmission screen having strong mechanical strength, enhanced image resolution, extremely narrow joints between screens and the like, consisting of a light transmissive panel, a lenticular lens sheet stacked on the light incident side of the light transmissive panel, a Fresnel lens sheet stacked on the light incident side of the lenticular lens sheet and optionally a light transmissive film stacked on the light incident side of the Fresnel lens sheet. The periphery of the light transmissive film or the periphery of the Fresnel lens sheet is joined to the light transmissive panel, resulting in the light transmissive panel, lenticular lens sheet, Fresnel lens sheet and light transmissive film being formed into a single-piece construction.

32 Claims, 3 Drawing Sheets

LIGHT TRANSMISSION SCREEN

BACKGROUND OF THE INVENTION

The present invention relates to a light transmission screen for use in projection type television receivers and the like whereby images are enlarged and projected by means of lenses.

In general, a light transmission screen is used in a large screen image display apparatus. A typical light transmission screen has a width ranging from about 700 mm to 1300 mm and a height ranging from about 500 mm to 1000 mm. FIG. 5 shows a cross-sectional view of a typical prior art light transmission screen. In FIG. 5, a lenticular lens sheet 101 and a Fresnel lens sheet 102 are superimposed on each other, and are cemented together by means of an adhesive tape 103. Further, the foregoing assembly formed of the lenticular lens sheet 101 and Fresnel lens 102 cemented together is fixed to a framework 104 by means of mounting hardware 105, screws 106 and the like.

According to the foregoing structures, rather expensive processes such as placing the adhesive tape, attaching the hardware 105 and screws 106 or the like are needed.

In order to solve this problem, a light transmission screen was proposed as described in Japanese Provisional Patent Publication No. 283736/92.

FIG. 6 shows a cross-sectional view of the above prior art light transmission screen.

In FIG. 6, a lenticular lens sheet 201 and a Fresnel lens sheet 202 are superimposed on each other and then the whole assembly is packaged by use of a heat-shrinkable transparent film 203.

After the interior of the foregoing package is evacuated, sealing vent portions 204 are sealed off by heating. Upon shrinking of the heat-shrinkable transparent film 203, the superimposed lenticular lens sheet 201 and Fresnel lens sheet 202 are further formed into a single-piece.

However, the light transmission screen of the foregoing structures has presented an inherent difficulty of making the combination of the lenticular lens sheet 201 and Fresnel lens sheet 202 thinner because of insufficient mechanical strength.

Furthermore, arrangements to hide the sealing vent portions 204 produced around the periphery of the heat-shrinkable transparent film 203 after sealing off by heating have caused the width of the framework to increase.

As a result, the widths of joints between screens in multi-screen structures, composed of a plurality of the light transmission screens by arranging them vertically as well as horizontally in a matrix, become rather large, thus creating a problem.

Moreover, a heat application apparatus and a heating process are required to produce the light transmission screens having the foregoing structure. Furthermore, evacuation equipment and an air removal process are required to produce a vacuum in the interior of the package formed by the heat-shrinkable transparent film 203.

All in all, a rather complicated production process was required to produce composite screens.

SUMMARY OF THE INVENTION

The present invention provides a light transmission screen with a strong mechanical strength and an extremely narrow width for the joint between screens.

The light transmission screen of the present invention comprises a light transmissive panel, a lenticular lens sheet stacked on the light incident side of the light transmissive panel, a Fresnel lens sheet stacked on the light incident side of the lenticular lens sheet and a light transmissive film stacked on the light incident side of the Fresnel lens sheet.

The lenticular lens sheet and Fresnel lens sheet are sealed by the aforementioned light transmissive panel and light transmissive film.

Accordingly, the light transmissive panel, lenticular lens sheet, Fresnel lens sheet and light transmissive film are formed into a single-piece construction.

Another light transmission screen of the present invention comprises a light transmissive panel, a lenticular lens sheet arranged on the light incident side of the light transmissive panel and a Fresnel lens sheet arranged on the light incident side of the lenticular lens sheet.

The periphery of the Fresnel lens sheet is joined to the aforementioned light transmissive panel. Thus, the light transmissive panel, lenticular lens sheet and Fresnel lens sheet are formed into a single-piece construction.

In the foregoing structures, the light transmissive panel, lenticular lens sheet and Fresnel lens sheet are formed into a single-piece construction, thus making it possible to maintain its shape and possess a sufficient mechanical strength to resist deformation. Therefore, the lenticular lens sheet and Fresnel lens sheet themselves do not have to possess a sufficient mechanical strength.

As a result, it becomes possible to make the respective thicknesses of the lenticular lens sheet and Fresnel lens sheet thinner, thereby increasing the freedom in designing the respective configurations of the lenticular lens sheet and Fresnel lens sheet. This results in enhancement of the screen's performance with respect to image resolution and the like.

Moreover, the width of the framework, where no images are displayed, can be made extremely small. This makes it possible to increase the effective image area within a limited screen size. As a result, the large image feature of a screen can be greatly enhanced.

Furthermore, with a multi-screen display system wherein a plurality of light transmission screens are arranged, the widths of joints between screens, where no images are displayed, can be made extremely small. This improves the effective image area ratio for a multi-screen display system by realizing a large screen with smaller image-free areas.

In the production of the foregoing light transmission screens, the lenticular lens sheet and Fresnel lens sheet can be easily affixed to the light transmissive panel. Therefore, the production process can be made simpler, while light transmission screens of excellent performance, as described above, are produced.

DETAILED DESCRIPTION OF THE INVENTION

A number of exemplary embodiments of the light transmission screen of the present invention will be explained as follows.

EXAMPLE 1

Figure 2:
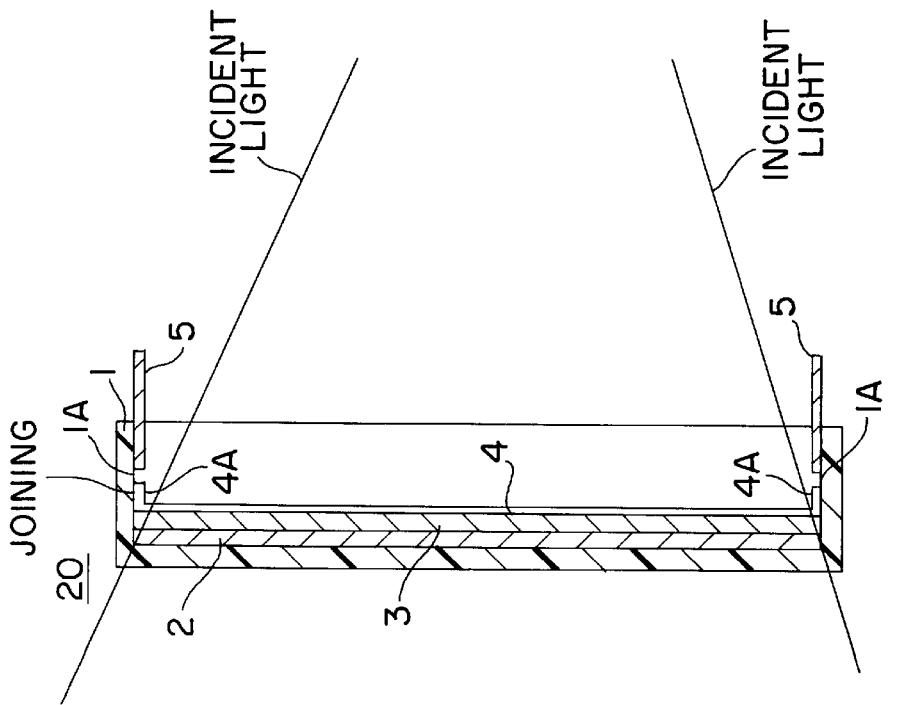
FIG. 2 is a cross-sectional view of the light transmission screen of FIG. 1.
Figure 1:
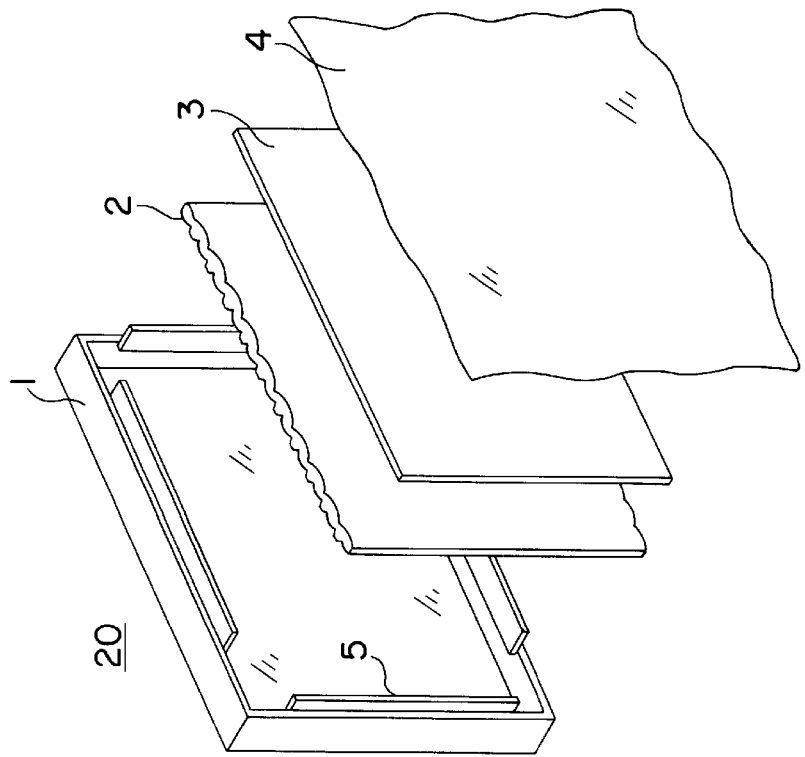
FIG. 1 is an exploded perspective view of a light transmission screen in accordance with an exemplary embodiment of the present invention.

The exploded perspective view of FIG. 1 and the cross-sectional view of FIG. 2 show structures of a light transmission screen in accordance with an exemplary embodiment of the present invention.

In FIG. 1 and FIG. 2, the light transmission screen 20 consists of a light transmissive panel 1, a lenticular lens sheet 2 arranged on the light incident side of the light transmissive panel 1, a Fresnel lens sheet 3 arranged on the light incident side of the lenticular lens sheet 2 and a light transmissive film 4 arranged on the light incident side of the Fresnel lens sheet 3. The lenticular lens sheet 2 and Fresnel lens sheet 3 are stacked successively on the light transmissive panel 1 and then sealed in by the light transmissive film 4. Accordingly, the light transmissive panel 1, lenticular lens sheet 2, Fresnel lens sheet 3 and light transmissive film 4 are assembled to form a single-piece construction.

The procedure for assembling the light transmission screen 20 is explained as follows.

First, the lenticular lens sheet 2 and Fresnel lens sheet 3 are successively stacked on the light incident side of the light transmissive panel 1. Then, the light transmissive film 4 is disposed on the light incident side of the Fresnel lens sheet 3, and the periphery of the light transmissive film 4 and the light transmissive panel 1 are joined with each other. Thus, the light transmissive panel 1, lenticular lens sheet 2, Fresnel lens sheet 3 and light transmissive film 4 are formed into a single-piece construction to complete the light transmission screen 20. By making the light transmissive panel 1, lenticular lens sheet 2, Fresnel lens sheet 3 and light transmissive film 4 in a single-piece construction, the integrated panel structure has sufficient mechanical strength to maintain its shape and prevent any deformation from taking place.

In particular, the light transmissive panel 1 is preferably made thick enough to have a mechanical strength whereby the shape thereof is strictly maintained even when the lenticular lens sheet 2 and Fresnel lens sheet 3 are stacked thereon. For example, the thickness of the light transmissive panel 1 preferably exceeds about 0.5 mm, and a thickness ranging from about 1 mm to about 3 mm is most preferred. No particular restrictions are imposed on the configuration of the light transmissive panel 1, but the surface of the light radiant side of the light transmissive panel 1 preferably has no openings, thus presenting a closed surface. It is also possible for the surface of the light radiant side of the light transmissive panel 1 to have a configuration with an opening of 4:3 or 16:9, representing an aspect ratio between width and height.

Also, it is preferred for the light transmissive panel 1 to have peripheral side walls 1A thereby having a box-like shape.

The light transmissivity of the light transmissive panel 1 is set to a certain predetermined value so that the ambient light can be absorbed and the contrast of images can be enhanced. For example, the light transmissive panel 1 is colored to a certain predetermined extent with a certain predetermined coloring material.

The light transmissivity, color and color depth of the light transmissive film 4 can be selected arbitrarily without any restrictions imposed thereon.

Regarding the method of joining the light transmissive film 4 and the light transmissive panel 1, there is no particular restriction imposed. For example, as shown in FIG. 2, the peripheral sections of the light transmissive film 4 (the four sides surrounding the film, for instance) are bent inward, and the bent portions 4A are joined to the inner surfaces of the side walls 1A of the light transmissive panel 1.

The joining method can use adhesion by an adhesive, sticking by a sticking tape or heat welding by a plastic film.

With the light transmission screen of FIGS. 1 and 2, the lenticular lens sheet 2, Fresnel lens sheet 3 and light transmissive film 4 are successively stacked on the light transmissive panel 1 to form a single-piece construction. By having the lenticular lens sheet 2, Fresnel lens sheet 3 and light transmissive film 4 formed into a single-piece construction with the light transmissive panel 1, the entire structure is provided with a strong mechanical strength, thereby protecting the whole integrated screen from deformation. Therefore, the lenticular lens sheet 2 and Fresnel lens sheet 3 can be made thinner, resulting in expanding the freedom of designing these lens sheets. The thinner lenticular lens sheet 2 and Fresnel lens sheet 3 contribute to an enhanced resolution of the images passing through the light transmission screen 20, and also suppress ghost image generation.

With the light transmission screen of FIGS. 1 and 2, the width of the peripheral sections of the light transmissive panel 1, where no images can be displayed (namely, the framework portion), can be made extremely narrow since the light transmissive panel 1 and light transmissive film 4 function to allow the incident light to pass through.

Figure 6:
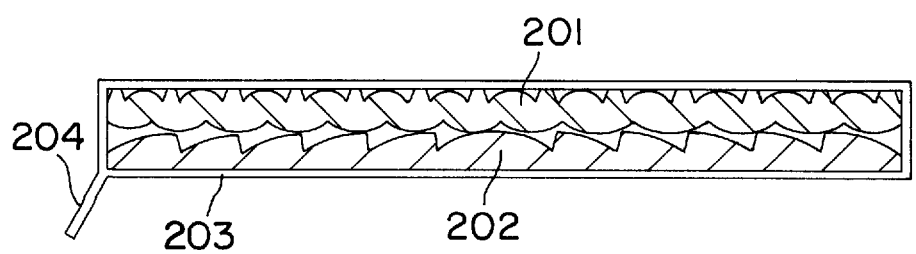
FIG. 6 is a cross-sectional view of another prior art light transmission screen.

Furthermore, there are no sealing vent portions 204 as required by the prior art example as shown in FIG. 6. The framework area, where no images are displayed, can be reduced by an area corresponding to the sealing vent portions 204 with a resulting reduction of the framework area in the peripheral section of the light transmissive panel 1, where no images are displayed, to an extremely small area. As a result, the width of the framework portions of the light transmissive panel 1, which surround the peripheral section of the screen and do not display any images, can be made extremely narrow. Therefore, within the limited dimensions of the screen, the effective display area for the screen can be made larger, thereby enhancing the effectiveness of a large screen display.

With the present example, it is also possible to employ a construction wherein mounting members 5 for mounting the screen to a housing cabinet (not shown in the drawings) are provided on the light transmissive panel 1 at positions that do not interfere with the paths for the light incident on the Fresnel lens sheet 3. This arrangement makes it possible to use almost the entire surface of the light transmissive panel 1 for displaying images on the screen. Therefore, within the limited dimensions of the screen, the effective image display area can be increased, thus enhancing the effectiveness of a large screen display.

Typical dimensional data on the light transmission screen of the present example are as follows:

Light transmission screen: 1072 mm wide, 608 mm high;

Light transmissive panel: 1072 mm wide, 608 mm high, 3 mm thick;

Lenticular lens sheet: 1066 mm wide, 602 mm high, 1 mm thick (max);

Fresnel lens sheet: 1066 mm wide, 602 mm high, 2 mm thick (max);

Light transmissive film: 1086 mm wide, 622 mm high, 0.05 mm thick;

Framework width: 5 mm.

EXAMPLE 2

A light transmission screen in accordance with a further exemplary embodiment of the present invention will be explained in conjunction with FIG. 3.

Figure 3:
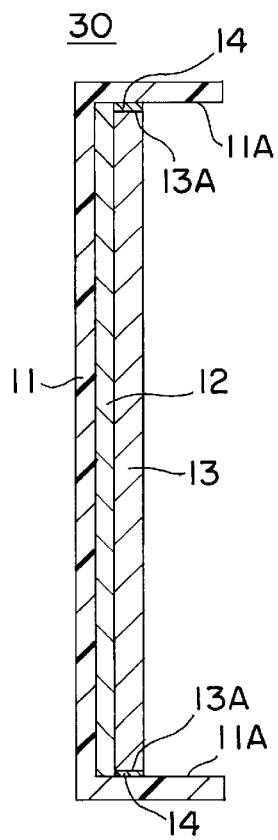
FIG. 3 is a cross-sectional view of a light transmission screen in accordance with a further exemplary embodiment of the present invention.

In FIG. 3, a light transmission screen 30 is comprised of a light transmissive panel 11, a lenticular lens sheet 12 arranged on the light incident side of the light transmissive panel 11 and a Fresnel lens sheet 13 arranged on the light incident side of the lenticular lens sheet 12.

The light transmissive panel 11 is provided with peripheral side walls 11A. The lenticular lens sheet 12 and Fresnel lens sheet 13 are stacked successively on the light transmissive panel 11. The end surfaces 13A of the Fresnel lens sheet 13 are joined to the side walls 11A of the light transmissive panel 11. Accordingly, the light transmissive panel 11, lenticular lens sheet 12 and Fresnel lens sheet 13 are formed into a single-piece construction.

The procedure for assembling the light transmission screen 30 is as follows.

First, the lenticular lens sheet 12 and Fresnel lens sheet 13 are successively stacked on the light incident side of the light transmissive panel 11. Then, the inner surfaces of the side walls 11A of the light transmissive panel 11 are joined to the end surfaces 13A of Fresnel lens sheet 13 by a joining means 14. Thus, the light transmissive panel 11, lenticular lens sheet 12 and Fresnel lens sheet 13 are formed into a single-piece construction to complete the light transmission screen 30.

The shape, light transmissivity, color and color depth are the same as explained in Example 1. The joining means 14 can be adhesives made from acrylic resin, epoxy resin and the like, or a double-sided adhesive tape.

With the present example, the light transmissive film 4 as used in Example 1 is no longer needed since the Fresnel lens sheet 13 is directly joined to the light transmissive panel 11.

With the light transmission screen of FIG. 3, the light transmissive panel 11, lenticular lens sheet 12 and Fresnel lens sheet 13 are formed into a single-piece construction by having the lenticular lens sheet 12 and Fresnel lens sheet 13 successively stacked on the light transmissive panel 11, and the peripheral portions of the Fresnel lens sheet 13 joined to the light transmissive panel 11.

By putting together the light transmissive panel 11, lenticular lens sheet 12 and Fresnel lens sheet 13 in a single-piece construction as described above, it is possible for the integrated panel structure to have a sufficient mechanical strength so as to maintain its shape and prevent any deformation from taking place.

In particular, the light transmissive panel 11 is preferably made thick enough to achieve a mechanical strength whereby the shape thereof is strictly maintained even when the lenticular lens sheet 12 and Fresnel lens sheet 13 are stacked thereon. For example, the thickness of the light transmissive panel 11 preferably exceeds about 0.5 mm, and a thickness ranging from about 1 mm to about 3 mm is most preferred.

With the structure of FIG. 3, the lenticular lens sheet and Fresnel lens sheet 13 can be made thinner, resulting in expanding the freedom of designing these lens sheets. The thinner lenticular lens sheet 12 and Fresnel lens sheet 13 contribute to an enhanced of resolution of the images passing through the light transmission screen 30, and also suppress ghost image generation.

Typical dimensional data on the light transmission screen of the present example are as follows:

Light transmission screen: 1072 mm wide, 608 mm high;

Light transmissive panel: 1072 mm wide, 608 mm high, 3 mm thick;

Lenticular lens sheet: 1066 mm wide, 602 mm high, 1 mm thick (max);

Fresnel lens sheet: 1066 mm wide, 602 mm high, 2 mm thick (max);

Framework width: 5 mm.

EXAMPLE 3

Figure 4:
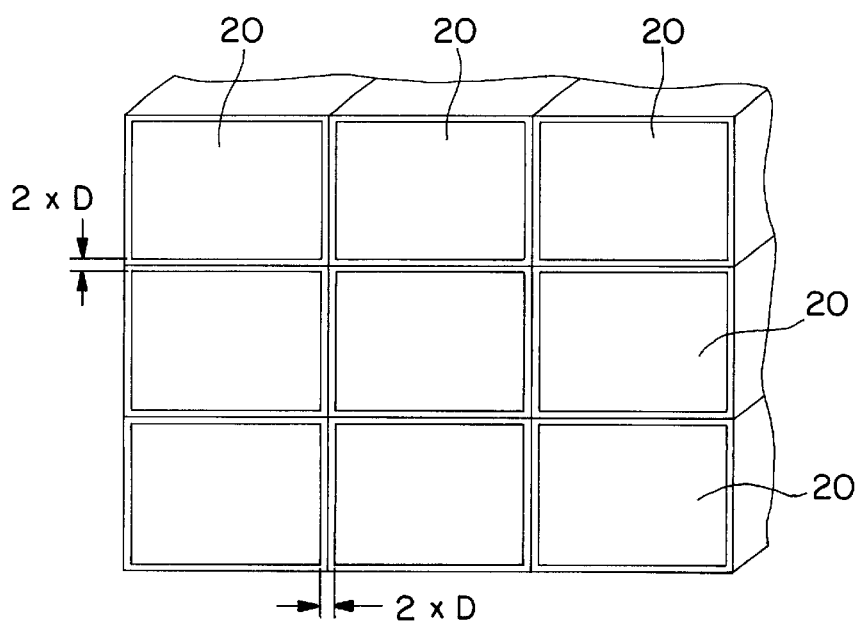
FIG. 4 is a perspective view of a multi-screen display system using the light transmission screens of the present invention.
Figure 5:
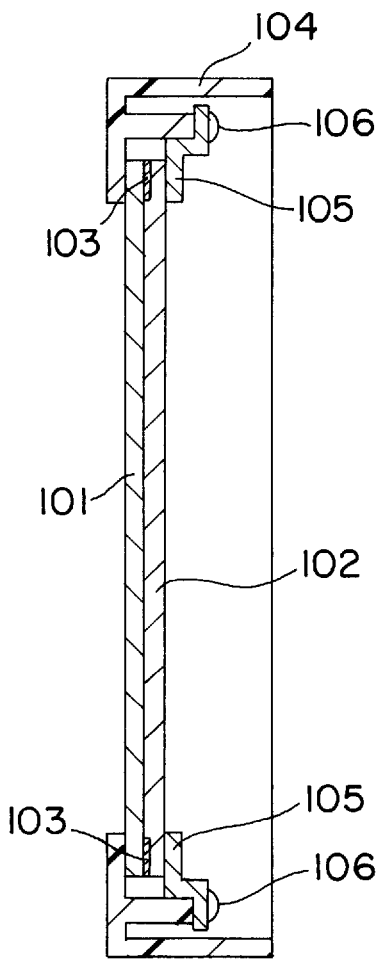
FIG. 5 is a cross-sectional view of a prior art light transmission screen.

FIG. 4 is a perspective view of a multi-screen display system for displaying large images, comprising a plurality of the light transmission screens 20 of Example 1, arranged in a matrix with 3 rows and 3 columns.

The framework width D of each respective light transmission screen, where no images are displayed, is extremely narrow as explained in Example 1.

In FIG. 4, the width of each vertical or horizontal joint between screens of the multi-screen display system, where no images are displayed, is equal to twice the framework width D of one light transmission screen.

Therefore, the multi-screen display system of the present example has an extremely small area where images are missing. This contributes to enhancing image resolution.

In Examples 1, 2 and 3, there are no particular restrictions imposed on the type of material that may be used to form the light transmissive panels 1 and 11, but acrylic resin, polycarbonate resin, polyester resin and the like are usually used.

The lenticular lens sheet 2 or 12 is a sheet with the surface thereof forming a plurality of lenses, each of which has a specified shape. There is no particular restriction imposed on the thickness of the lenticular lens sheet 2 and 12, which varies according to the shapes of lenses formed on each sheet, and ranges from about 0.1 mm to 2.0 mm. Particularly, a thickness ranging from about 0.5 mm to 1.5 mm is desirable.

The Fresnel lens sheet 3 or 13 is a sheet with the surface thereof forming a plurality of lenses, each of which has a specified shape. There is no particular restriction imposed on the thickness of the Fresnel lens sheets 3 and 13 which varies according to the shapes of lenses formed on each sheet and ranges from about 0.1 mm to 3.0 mm. Particularly, a thickness ranging from about 1 mm to 2.5 mm is desirable.

There are no particular restrictions imposed on the types of material that may be used to form the lenticular lens sheet 2 and 12 and the Fresnel lens sheets 3 and 13, but acrylic resin, polycarbonate resin, polyester resin and the like are usually used.

The light transmissive film 4 is a film with an almost flat surface.

There is no particular restriction imposed on the thickness of the light transmissive film 4, but a thickness ranging from about 0.01 mm to 0.5 mm, for example, is desirable.

There are no particular restrictions imposed on the what material types that may be used to form the light transmissive film 4, but ordinary plastic films such as polyethylene, polyester, polycarbonate and the like are usually used.

There is no particular restriction imposed on the dimensions of the light transmission screen, but screen dimensions of 700 mm to 1300 mm in width and 500 mm to 1000 mm in height, for example, are used.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A light transmission screen comprising:
    a light transmissive panel having an optical surface;
    a lenticular lens sheet positioned on the light incident side of said light transmissive panel;
    a Fresnel lens sheet positioned on the light incident side of said lenticular lens sheet; and
    a light transmissive film positioned on the light incident side of said Fresnel lens sheet, wherein a periphery of said light transmissive film is bent to form a plurality of bent portions which extend away from the optical surface of said light transmissive panel so that said bent portions are joined to said light transmissive panel with said lenticular lens sheet and said Fresnel lens sheet situated therebetween;
    wherein said lenticular lens sheet and said Fresnel lens sheet are positioned between said light transmissive film and said light transmissive panel.

2. A light transmission screen according to claim 1, wherein said light transmissive panel has a plurality of peripheral side walls.

3. A light transmission screen according to claim 2, wherein said periphery of said light transmissive film is joined to said side walls of the light transmissive panel.

4. A light transmission screen according to claim 3, wherein said periphery of the light transmissive film is bent to form a plurality of bent portions which are joined to said side walls.

5. A light transmission screen according to claim 2, further comprising a plurality of mounting members disposed on said side walls for fixing the side walls to a cabinet.

6. A light transmission screen according to claim 1, wherein a surface on the light radiant side of said light transmissive panel is free of an opening.

7. A light transmission screen comprising;
    a light transmissive panel having an optical surface;
    a lenticular lens sheet positioned on the light incident side of said light transmissive panel; and
    a Fresnel lens sheet positioned on the light incident side of said lenticular lens sheet, wherein a periphery of said Fresnel lens sheet is joined to said light transmissive panel with said lenticular lens sheet situated therebetween;
    a light transmissive film positioned on the light incident side of said Fresnel lens sheet, wherein a periphery of said light transmissive film is bent to form a plurality of bent portions which extend away from the optical surface of said light transmissive panel so that said bent portions are joined to said light transmissive panel with said lenticular lens sheet and said Fresnel lens sheet situated therebetween;
    wherein said light transmissive panel, said lenticular lens sheet and said Fresnel lens sheet form a single-piece construction.

8. A light transmission screen according to claim 7, wherein said light transmissive panel has a plurality of peripheral side walls.

9. A light transmission screen according to claim 8, wherein a plurality of end surfaces of said periphery of the Fresnel lens sheet are joined to said side walls of the light transmissive panel.

10. A method of manufacturing a light transmission screen comprised of a light transmissive panel having an optical surface, a lenticular lens sheet positioned on the light incident side of said light transmissive panel, a Fresnel lens sheet positioned on the light incident side of said lenticular lens sheet and a light transmissive film positioned on the light incident side of said Fresnel lens sheet, comprising the steps of:
    (a) positioning said lenticular lens sheet and Fresnel lens sheet successively on the light incident side of said light transmissive panel;
    (b) positioning said light transmissive film on the light incident said of said Fresnel lens sheet;
    (c) bending a periphery of said light transmissive film to form a plurality of bent portions which extend away from said light transmissive panel; and
    (d) joining said bent periphery to said light transmissive panel with said lenticular lens sheet and said Fresnel lens sheet situated therebetween, wherein said light transmissive panel, said lenticular lens sheet and said Fresnel lens sheet form a single-piece construction.

11. A method of manufacturing a light transmission screen according to claim 10, wherein said light transmissive panel is box-shaped and has a plurality of side walls formed along a periphery thereof.

12. A method of manufacturing a light transmission screen according to claim 11, wherein said periphery of the light transmissive film is provided with a plurality of bent sections joined to said side walls.

13. A method of manufacturing a light transmission screen comprised of a light transmissive panel having an optical surface, a lenticular lens sheet positioned on the light incident side of said light transmissive panel, a Fresnel lens sheet positioned on the light incident side of said lenticular lens sheet, and a light transmissive film positioned on the light incident side of said Fresnel lens sheet, comprising the steps of:
    (a) positioning said lenticular lens sheet and Fresnel lens sheet successively on the light incident side of said light transmissive panel;
    (b) joining a periphery of said Fresnel lens sheet to said light transmissive panel with said lenticular lens sheet situated therebetween wherein said light transmissive panel and said lenticular lens sheet form a single-piece construction,
    (c) bending a periphery of said light transmissive film to form a plurality of bent portions which extends away from said light transmissive panel, and
    (d) joining said bent periphery to said light transmissive panel.

14. A method of manufacturing a light transmission screen according to claim 13, wherein said light transmissive panel is box-shaped and has a plurality of side walls formed along a periphery thereof.

15. A light transmission screen according to claim 14, wherein a plurality of end surfaces of said periphery of the Fresnel lens sheet are joined to said side walls of the light transmissive panel.

16. A system for displaying large screen images comprising a plurality of light transmission screens positioned in a matrix, each one of said light transmission screens comprising a light transmissive panel having an optical surface, a lenticular lens sheet positioned on the light incident side of said light transmissive panel, a Fresnel lens sheet positioned on the light incident side of said lenticular lens sheet and a light transmissive film positioned on the light incident side of said Fresnel lens sheet, wherein a periphery of said light transmissive film is bent to form a plurality of bent portions which extend away from the optical surface of said light transmissive panel so that said periphery is joined to said light transmissive panel with said lenticular lens sheet and said Fresnel lens sheet situated therebetween.

17. A system for displaying large screen images comprising a plurality of light transmission screens positioned in a matrix, each one of said light transmission screens comprising a light transmissive panel having an optical surface, a lenticular lens sheet positioned on the light incident side of said light transmissive panel, a Fresnel lens sheet positioned on the light incident side of said lenticular lens sheet, and a light transmissive film positioned on the light incident side of said Fresnel lens sheet, wherein a periphery of said Fresnel lens sheet is joined to said light transmissive panel with said lenticular lens sheet situated therebetween, wherein a periphery of said light transmissive film is bent to form a plurality of bent portions which extend away from the optical surface of said light transmissive panel so that said periphery and wherein said light transmissive panel, said lenticular lens sheet and said Fresnel lens sheet form a single-piece construction.

18. A light transmission screen according to claim 1, wherein said light transmissive panel is manufactured from a material selected from the group comprising acrylic resin, polycarbonate resin and polyester resin.

19. A light transmission screen according to claim 1, wherein said light transmissive film is plastic.

20. A light transmission screen according to claim 1, wherein said light transmission screen has a width from about 700 mm to about 1300 mm and a height from about 500 mm to about 1000 mm.

21. A light transmission screen according to claim 1, wherein a point at which said periphery of said light transmissive film and said light transmissive panel are joined is without said lenticular lens sheet therebetween.

22. A light transmission screen according to claim 7, wherein a point at which said periphery of said light transmissive film and said light transmissive panel are joined is without said lenticular lens sheet therebetween.

23. A light transmission screen according to claim 10, wherein a point at which said periphery of said light transmissive film and said light transmissive panel are joined is without said lenticular lens sheet therebetween.

24. A light transmission screen according to claim 13, wherein a point at which said periphery of said light transmissive film and said light transmissive panel are joined is without said lenticular lens sheet therebetween.

25. A light transmission screen according to claim 16, wherein a point at which said periphery of said light transmissive film and said light transmissive panel are joined is without said lenticular lens sheet therebetween.

26. A light transmission screen according to claim 17, wherein a point at which said periphery of said light transmissive film and said light transmissive panel are joined is without said lenticular lens sheet therebetween.

27. A light transmissive screen according to claim 1, wherein said periphery which is bent forms a bend, said periphery extending from said bend and away from the optical surface of said light transmissive panel.

28. A light transmissive screen according to claim 7, wherein said periphery which is bent forms a bend, said periphery extending from said bend and away from the optical surface of said light transmissive panel.

29. A method of manufacturing a light transmissive screen according to claim 10, wherein said periphery which is bent forms a bend, said periphery extending from said bend and away from the optical surface of said light transmissive panel.

30. A method of manufacturing a light transmissive screen comprised of a light transmissive panel according to claim 13, wherein said periphery which is bent forms a bend, said periphery extending from said bend and away from the optical surface of said light transmissive panel.

31. A system for displaying large screen images according to claim 16, wherein said periphery which is bent forms a bend, said periphery extending from said bend and away from the optical surface of said light transmissive panel.

32. A system for displaying large screen images according to claim 17, wherein said periphery which is bent forms a bend, said periphery extending from said bend and away from the optical surface of said light transmissive panel.

* * * * *